(12) United States Patent
Samuels

(10) Patent No.: US 6,363,085 B1
(45) Date of Patent: Mar. 26, 2002

(54) UNIVERSAL SERIAL BUS REPEATER

(75) Inventor: James Vincent Samuels, Monmouth Junction, NJ (US)

(73) Assignee: MultiVideo Labs, Inc., Princeton, NJ (US)

( * ) Notice: Subject to any disclaimer, the term of this patent is extended or adjusted under 35 U.S.C. 154(b) by 0 days.

(21) Appl. No.: 09/046,442

(22) Filed: Mar. 23, 1998

(51) Int. Cl.[7] .............................................. H04L 12/50
(52) U.S. Cl. ...................... 370/502; 370/252; 370/242
(58) Field of Search ................................ 370/242, 247, 370/252, 253, 498, 501, 502; 710/100, 113, 126, 101

(56) References Cited

U.S. PATENT DOCUMENTS

| | | | | |
|---|---|---|---|---|
| 5,903,777 A | * | 5/1999 | Brief ........................... | 395/880 |
| 5,987,617 A | * | 11/1999 | Hu et al. ..................... | 713/320 |
| 6,012,096 A | * | 1/2000 | Link et al. ................... | 709/200 |
| 6,021,129 A | * | 2/2000 | Martin et al. ............... | 370/395 |
| 6,073,205 A | * | 6/2000 | Thomson ..................... | 711/100 |
| 6,122,676 A | * | 9/2000 | Brief et al. .................... | 710/9 |

* cited by examiner

*Primary Examiner*—Ricky Ngo
(74) *Attorney, Agent, or Firm*—Carl M. Wright

(57) ABSTRACT

Universal Serial Bus active extension cable for increasing the distance between devices coupled via a Universal Serial Bus cable includes a pair of transceivers for bidirectional transmission of data therealong. A drive detector senses which terminal device is transmitting data and enables the other terminal device to receive the data. A speed detector senses which of more than one transmission speed is being used and sets the devices coupled to the cable accordingly. An end-of-packet detection determines when the transmission of a packet of data has been completed. When the system enters a suspend mode, a detector sets the components to a low power mode.

3 Claims, 4 Drawing Sheets

UNIVERSAL SERIAL BUS REPEATER

BACKGROUND OF THE INVENTION

This invention relates to the Universal Serial Bus (USB). USB is a peripheral bus standard developed by PC and telecom industry leaders that bring plug and play of computer peripherals outside the box, eliminating the need to install cards into dedicated computer slots and reconfigure the system. Personal computers equipped with USB allow computer peripherals to be automatically configured as soon as they are physically attached—without the need to reboot or run setup. USB also allows multiple devices—up to 127—to run simultaneously on a computer, with peripherals such as monitors and keyboards acting as additional plug-in sites, or hubs.

The cable length is critical in maintaining the signal integrity and the protocol timing. Excessive cabling can cause a USB device not to function correctly or not be recognized by the host system. Device manufacturers are given the freedom to save cost by not building in an expensive overkill. Therefore, by just adding a passive extension cable the signal can be delayed or distorted to an amount that would cause the problem described.

BRIEF SUMMARY OF THE INVENTION

It is the object of the invention to allow a USB device to increase its distance from the host system well beyond the USB specification for cable length while staying within the USB specifications for signal timing.

The invention acts as a repeater. That is, it accepts the signal from one direction via a transceiver, then repeats the same signal out the other direction via another transceiver. The invention also complies with all USB protocol which includes sensing of a high-speed or low-speed device, going into the suspend mode, and detecting an end of packet.

BRIEF DESCRIPTION OF THE DRAWING

The invention is described in detail by referring to the various figures that illustrate specific embodiments of the invention, and wherein like numerals refer to like elements.

DESCRIPTION OF THE PREFERRED EMBODIMENT

The USB is a four-wire bus consisting of two differential signals, power (+5V), and ground. It is a master slave bus whereby the direction of the buffer's driving signals is controlled by the master and the timing for changing directions is set in the architecture of the wire protocol.

The USB allows for high-speed devices (the bus running at 12 MHz) and low-speed devices (the bus running at 1.5 MHz.) A device lets the host know its speed by the dc voltage on the bus during the idle time. A USB device will have its D+ signal pulled high through a 1.5K resistor if it is a high-speed device. A low-speed device will have its D− signal pulled high through a 1.5K resistor.

Each transaction on the bus begins with a Start of Packet (SOP) and ends with an End of Packet (EOP). The SOP begins with the bus changing from the idle state (called the J state) to its inverse state (the K state). An EOP begins with the bus being driven to a single ended zero (SEO) state (both D+ and D− pulled low) and ends when the SEO is removed. The USB host system sends out a short Start of Frame (SOF) packet every millisecond. When the SOF discontinues, all devices must go into the suspend state and limit the amount of power the device takes from the bus. A device can take the bus out of the suspend state by sending a resume signal upstream. This is done by placing a K state signal on the bus for a minimum of ten milliseconds. The USB resets the device by placing a SEO on the bus for a minimum of ten milliseconds.

The connection to the host is referred to as the upstream (US) port and the connection to the device as the downstream (DS) port. The cable connectors for upstream and downstream ports are different to assure that devices are not plugged in incorrectly. The upstream USB cable of the invention is the extension of the cable length.

The invention receives data from the USB upstream port and sends the same data downstream. It also receives data from the downstream port and sends the same data upstream. When a reset signal is transmitted downstream, the invention assures that it continues downstream. If a resume signal is transmitted either upstream or downstream, the invention keeps the signal going in the correct direction. When the invention detects that the bus is in its suspend state, the circuits go into a low power mode.

Figure 1:
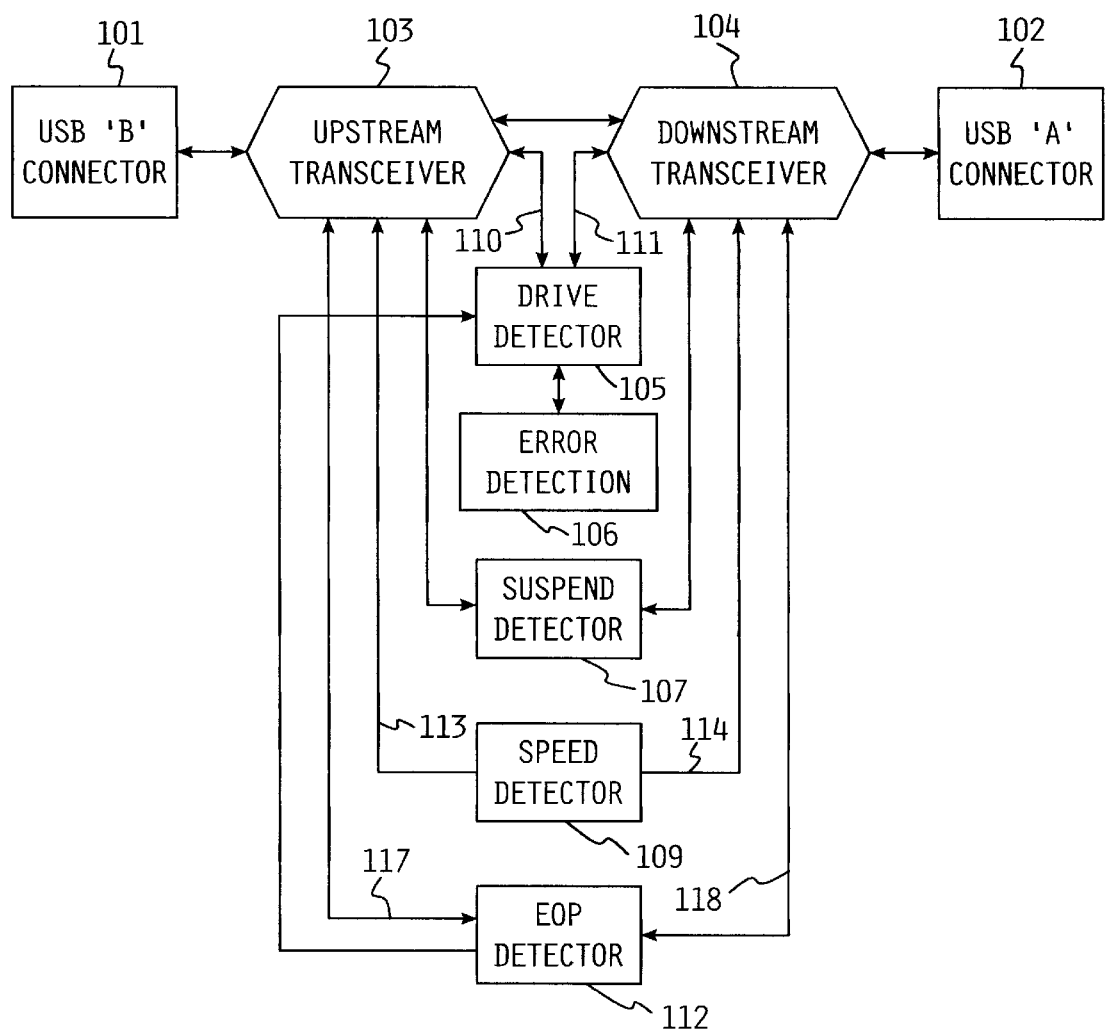
FIG. 1 is block diagram of the invention.

FIG. 1 shows the major components of the invention. The upstream USB cable plugs into the USB type 'B' connector 101. The downstream USB device's cable plugs into the USB type 'A' connector 102. The upstream signals are received by the upstream transceiver 103 and sent downstream via transceiver 104. Similarly, the signal generated downstream is received by transceiver 104 and transmitted by transceiver 103 upstream. The Speed Detector 109 detects the device's speed from the differential signal when the bus is idle via a bus 114 and puts that state signal 113 to the upstream port. When data is not present on the bus, both transceivers 103 and 104 are in their high impedance receive mode. The Drive Detector 105 senses received data via buses 110 and 111. When data is received from the upstream port 101, Drive Detector 105 senses that the upstream transceiver 103 has received the initial bit of data by detecting an SOP signal. The drive of the downstream transceiver 104 is enabled while keeping upstream transceiver 103 in its high impedance mode. The data will continue to be received and transmitted until the EOP Detector 112 senses the EOP. At that time, the transceivers both resume their high impedance receive mode. When data is received from the upstream port 102, the process is reversed. If for some reason the EOP is not detected e.g., because of connect/disconnect glitches, the Error Detector 106 will time out and disable the transceivers' drive. The Suspend Detector 107 senses when no bus activity has occurred for more than three to eight SOF periods. When this occurs, the power reduced suspend state is entered by putting the transceivers 103 and 104 into their power reduced mode.

In the following explanations, signals are identified by a mnemonic followed by a reference numeral designating on which line a signal occurs. Signal mnemonics preceded by US or DS are associated with upstream or downstream sides, respectively. For example, DSFSEO 208 is a downstream SEO signal on line 208.

Figure 2:
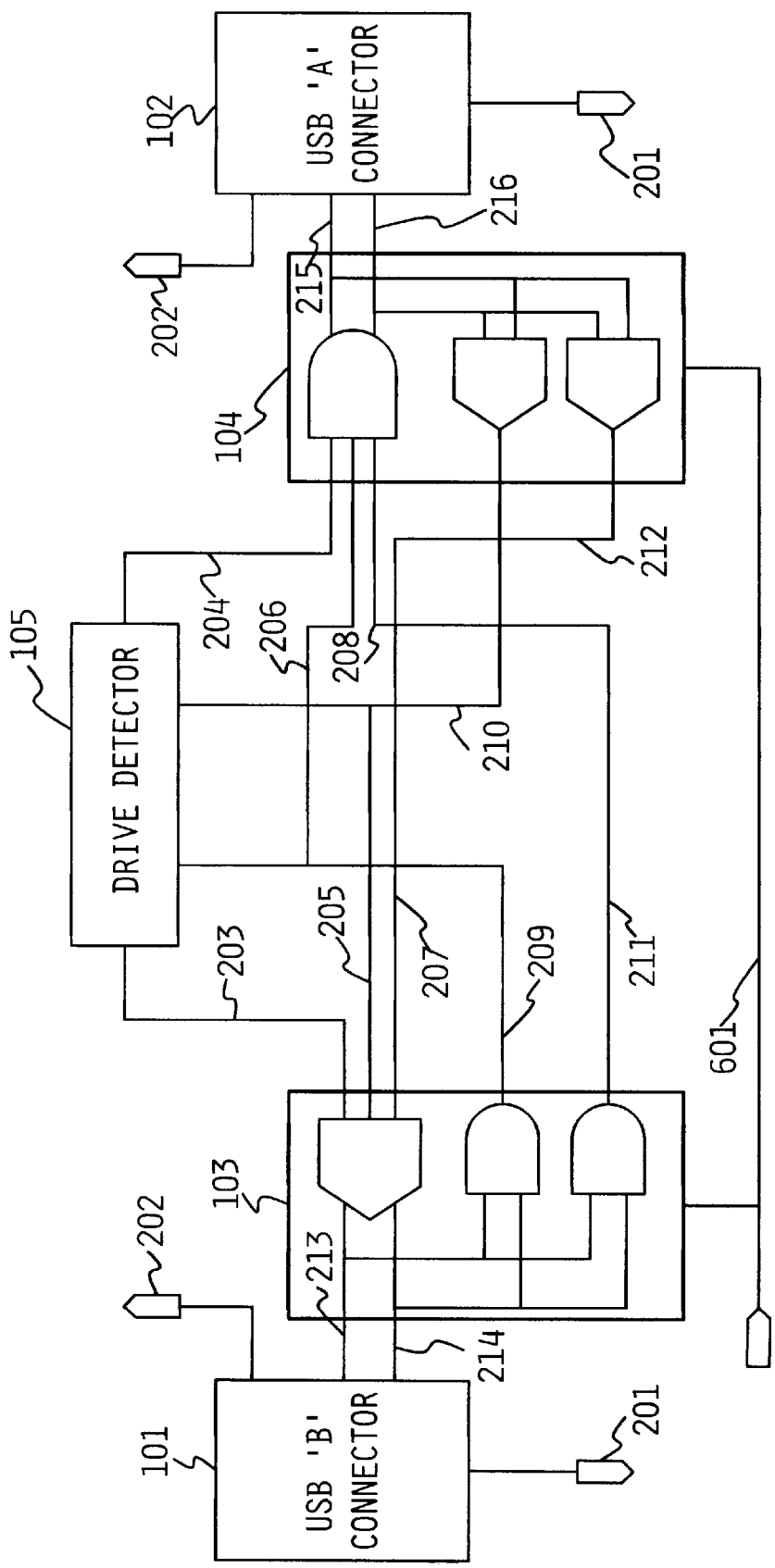
FIG. 2 is block diagram of the interconnection between the two transceivers.

FIG. 2 shows the interconnection between the two transceivers 103 and 104. For the downstream port 102, the bus output lines DSD−215 and DSD+216 are driven by DSINP 206, and generates an SE0 by DSFSEO 208 only when the transceiver's outputs are enabled by DSOE 204. The bus inputs DSD−215 and DSD+216 are sensed differentially to produce a received output DSREC 210. The inputs are also used to detect a Single Ended Zero DSSEO 212. The same is true for the upstream transceiver 103. Whichever transceivers' received data signals USREC 209 or DSREC 210 occurs first, the Drive Detector 105 enables the opposite output enable USOE 203 or DSOE 204. The upstream received data USREC 209 is the drive for the downstream input DSINP 206. The downstream received data USREC 210 is the drive for the upstream input DSINP 207. The downstream received DSSEO 212 is the drive for the upstream USFSEO 207. The upstream received USSEO 211 is the drive for the downstream DSFSEO 208. SUSP 601 is normally low. When the Suspend Detector 107 determines that the bus is in the suspend state, SUSP 601 goes high and puts the transceivers into their low current suspend state.

Figure 3:
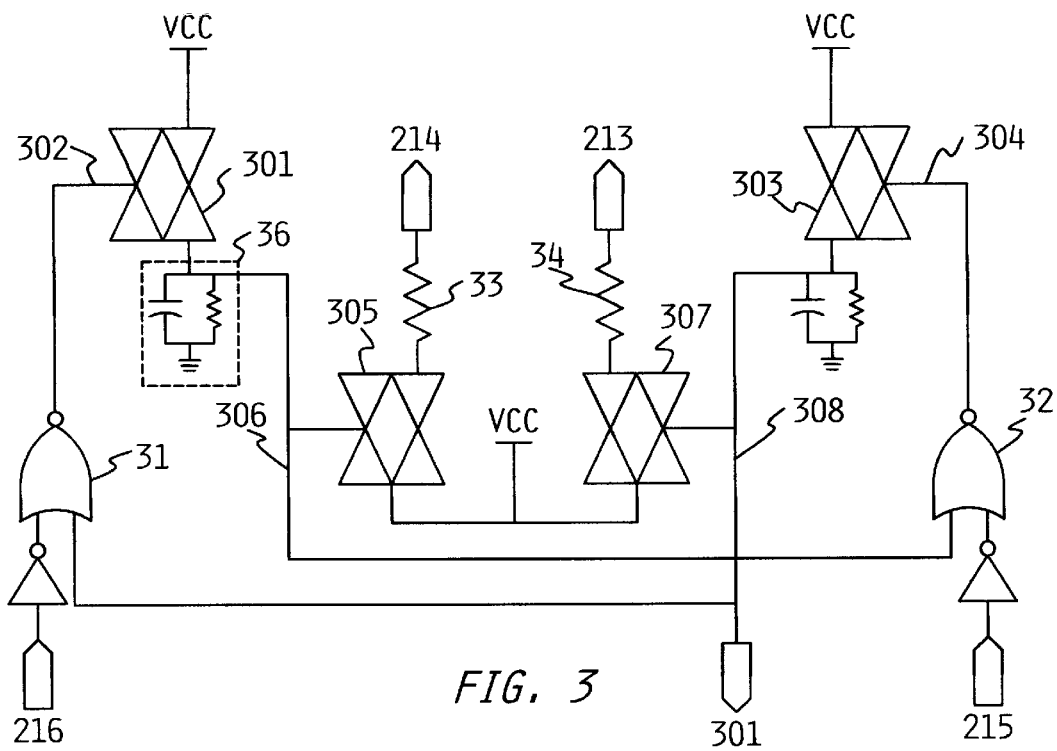
FIG. 3 is a schematic of the circuit that determines the speed type of the attached device on the downstream port and switches in the correct resistor on the upstream port which indicates the speed of the attached device.

FIG. 3 is a schematic of a circuit that determines the speed type of the attached device on the downstream port and switches in the correct resistor on the upstream port. The HC4066's are FET switches 301, 303, 305, 307 are enabled when their control inputs 302, 304, 306, 308 are high. When no device is attached to the downstream port both DSD−215 and DSD+216 are low (0 volts). These signals are inverted which causes both of the outputs of the NOR gates 31 and 32 to go low; these outputs disable FET switches 301 and 303. Since 301 and 305 are disabled, their inputs to FET switches 305 and 307 are low which disables them and resistor's 33 and 34 are not connected to the upstream port USD−213 and USD+214. When no pull ups are connected to the port, the upstream host senses it and determines that nothing is connected. When a full speed device is connected downstream, DSD+216 will go high and DSD−will stay low; these are the idle (J) states. During bus activity, the bus will be in the J state most of the time. When DSD+ initially goes high, the output signal from an or gate 31 will also go high to enable 301. Enabling 301 puts +5V on the RC SAMPLE-AND-HOLD 36. This high voltage also prevents the or gate 32 from enabling FET switch 303. The SAMPLE-AND-HOLD output enables switch 305 and 3.6V is placed on resistor 33 that pulls up USD+214. This tells the host that a full speed device is attached. During bus activity DSD+214 will go low at times. The SAMPLE-AND-HOLD circuit will assure that the 3.6V is still coupled to resistor 33. The SAMPLE-AND-HOLD time constant is chosen to assure that normal bus activity does not cause switch 305 to be disabled. When a low-speed device is attached to the downstream port, DSD−215 is high and the circuit mirrors that of the full speed circuit. The signal FULLSP 301 is high when a full speed device is attached and low when a low-speed device is attached. This signal is also used elsewhere.

Figure 4:
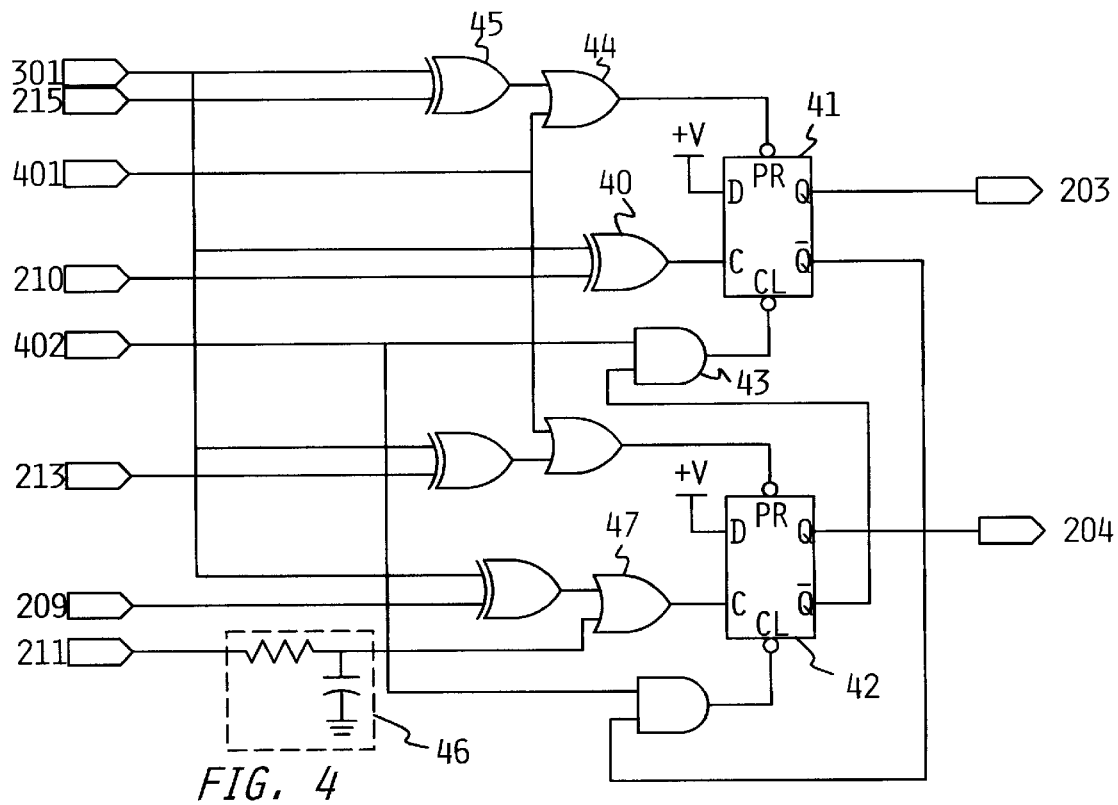
FIG. 4 is a schematic of the circuit that detects which port is receiving data and enables the output of the transmitting transceiver.

FIG. 4 is a schematic of a circuit that detects which port is receiving data and enables the output of the transmitting transceiver. The two sections of the circuit, upstream and downstream, function almost identical. When the downstream port receives data while both ports are in their idle state, DSREC 210 will go from its J state to its K state. For full speed devices, the J state is high and the K state is low. The reverse is true for low-speed devices. The XOR gate insures that the same signal will be produced regardless of a full speed or low-speed device. FULLSP 301 from FIG. 3 is high when a full speed device is attached and low when a low-speed device is attached. Since this signal is XOR'ed with DSREC 210, the output signal from the XOR gate 40 will be low for either J state and high for either K state. The XOR clocks the input of a D-flip-flop 41. When the clock input goes high, signifying a SOP, USOE 203 which goes to the upstream transceiver in FIG. 2, goes high since the D input of flip-flop 41 is high. When the set output signal from the flip-flop 41 USOE 203 goes high, the upstream transceiver 104 is enabled and the data received from the downstream port 102 is fed upstream 101. The reset output of from flip-flop 41 #USOE 403 goes to the clear input of an upstream drive detector D-flip-flop 42. This assures that only one transceiver's output is enabled at a time. The signal #EOPPULSE 402 is generated by the EOP Detector 112 of FIG. 1. It is normally high and pulses low for approximately twenty nanoseconds after the EOP is completed (see FIG. 5.) The input signal #EOPPULSE 402 is ANDed with the reset output signal from the flip-flop 42 by and AND gate 43 whose output signal drives the clear input of the flip-flop 41. This does two things. It does not allow USOE 203 to be enabled if the downstream port is transmitting, and it disables USOE 203 after the EOP is completed. When the invention enters the suspend mode, #SUSP 401 from FIG. 6 is low. Since it is normally high and drives OR gate 44 output high, the D-flip-flop 41 is set. The signal to clock the flip-flop 44 is chosen to be DSREC 210 instead of DSD−215 since DSD−215 could have glitches on it and DSREC 210 is the true received data. However, when the transceivers 101 and 102 are in the suspend mode, DSREC 210 and USREC 209 are not enabled. In order to sense when to come out of suspend, DSD−215 and USD−214 are sensed. DSD−215 goes to an input of an XOR gate 45 with the other input going to FULLSP 301. The output of signal from the XOR gate 45 is thus normally high and goes low at the SOP. This signal drives the Preset input of the D-flip-flop U2B that enables USOE 203 to drive the upstream transceiver 104. Immediately thereafter, #SUSP 401 goes from low to high and normal operation begins, ignoring DSD−215 to the preset. The upstream Drive Detector works the same as the downstream except for one added section. When the host initializes a port it resets the port first. The reset consists of an SEO for a minimum of ten milliseconds. When an SEO occurs, DSD−215 can be any state yet the circuit must be able to receive the reset and send it downstream. USSEO 211 is coupled to a filter 46 to the input of an OR gate 47. The filter to eliminate any glitches caused by signal crossover. When USSEO 211 goes high, it supplies a clock signal to the D-flip-flop 42 which enables DSOE 204 to send the reset downstream.

Figure 5:
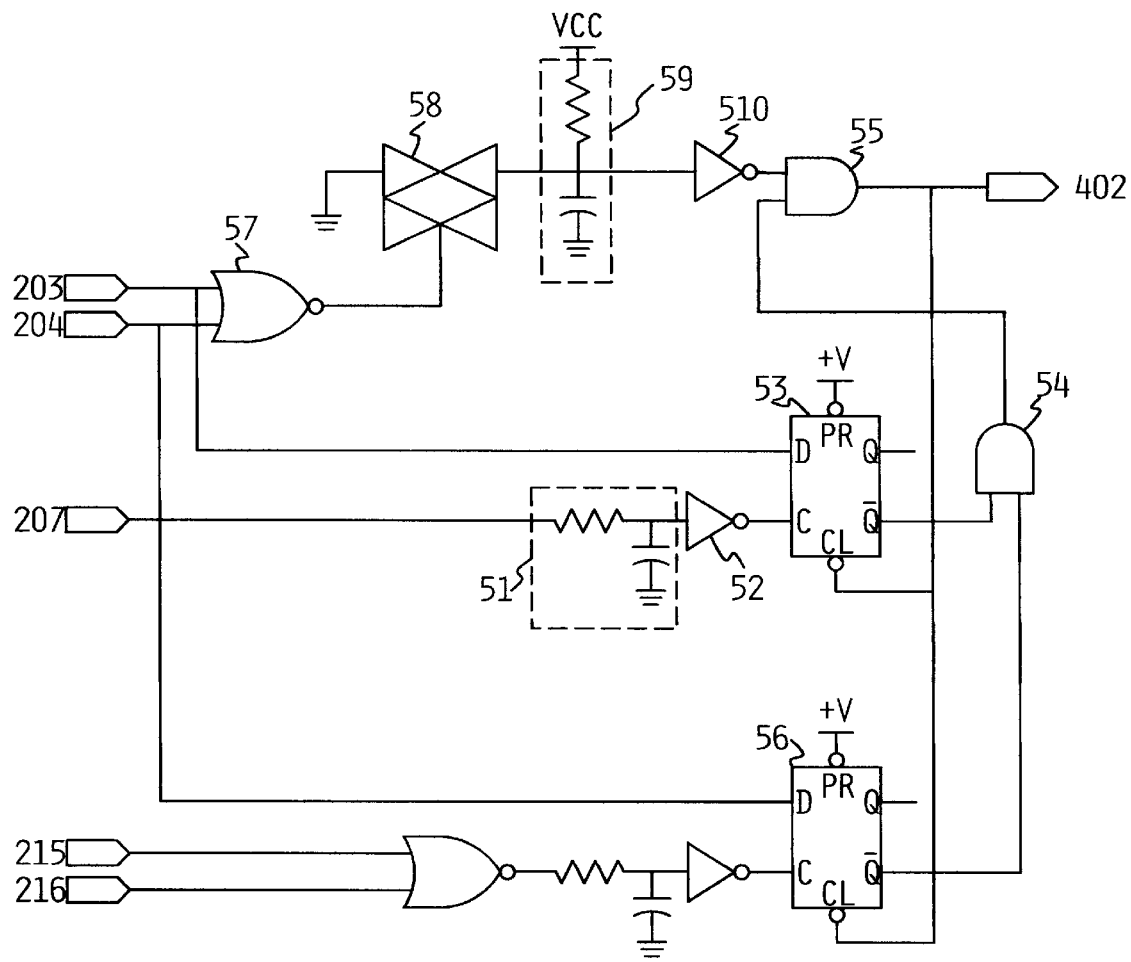
FIG. 5 is a schematic of the circuit that detects an EOP (End of Packet) and disables the transceivers, as well as the circuit that disables the transceivers if the transceivers are enabled too long.
Figure 6:
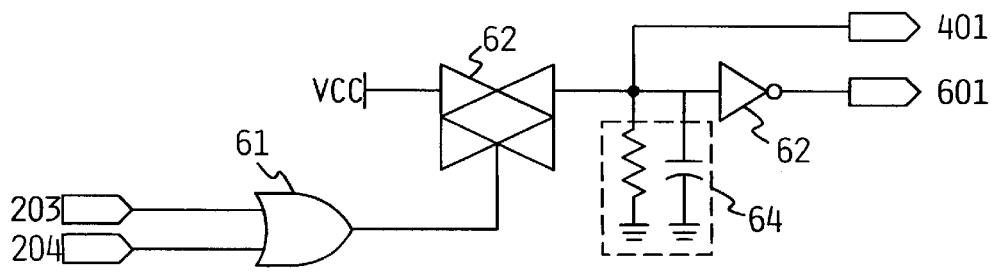
FIG. 6 is a schematic of the circuit that detects when the bus is in the suspend mode.

FIG. 5 is a schematic of the circuit that detects an EOP and disables the transceivers. It also includes the circuit that disables the transceivers if the transceivers are enabled too long. An EOP begins with a SEO transmitted and is completed when the SE0 stops. When data is received upstream, DSOE 203 is high. When an upstream SE0 is detected, USSE0 207 goes high and passes through a low pass filter 51 to insures that glitches due to transceiver crossover does not trip the circuit. When the output signal from the filter 51 go high, an inverter which goes low. 52 output signal drives the clock of D-flip-flop 53. When the SE0 is removed, signifying that the transmission is completed, USSE0 207 goes low. Now the low pass filter 51 delays the signal to the D-flip-flop 52 to assure that the bus will still be driven a short time after the EOP so that the bus's idle state can be achieved quickly. The D-flip-flop 52 clock goes high, its reset output goes low and enables an AND gate 54 causing it's output to go low. The AND gate 54 output primes an AND gate 55 causing its output #EOPPULSE 402 to go low. In FIG. 4, #EOPPULSE 402 disables both transceivers' output. #EOPPULSE 402 also causes D-flip-flop 53 output to go high which drives #EOPPULSE 402 to its high idle state so that the Drive Detect 105 circuit can be ready to look for another transmission. The circuit for downstream EOP detection using D-Flip-Flop 56 performs the same way. During connection, it is possible for glitches to appear on the bus so that Drive Detector 105 senses that a transmission has started. Since no transmission did start, an EOP will not be sent and the invention can be in a state where it cannot detect transmissions. Therefore, if either transceiver is enabled for over two milliseconds (less than one millisecond is the maximum a transceiver could be enabled under normal operation), #EOPPULSE 402 will be enabled. If either USOE 203 or DSOE 204 are enabled, a NOR gate 57 output signal will turn off an FET switch 58 so its output will be in its high impedance mode. A Sample-and-hold circuit 59 will increase toward VCC. When its voltage reaches the switching threshold of an inverter 510 its output goes low and drives AND gate 55 output #EOPPULSE 402 low so the transceiver's output enables are disabled.

FIG. 6 is a schematic of the circuit that detects when the bus is in the suspend state. During normal bus operation, USOE 203 is enabled at least once every one millisecond due to the SOF. Anytime either USOE 203 or DSOE 204 are enabled an OR gate 61 is enabled which turns on an FET switch 62 and its output #SUSP 401 is high and an inverter 63 output SUSP 601 is low; signifying normal operation. When both USEO 203 and DSOE 204 are not enabled, sample and hold circuit 64 output to decay to 0V with a time constant of at least three milliseconds. If before 3 ms either USEO 203 or DSOE 204 are enabled, the sample and hold circuit 64 returns high. If after 3 ms neither USEO 203 or DSOE 204 are enabled, the sample and hold circuit 64 will go low which enables SUSP 601 and puts the transceivers into their low current suspend state.

While the invention has been particularly shown and described with reference preferred embodiments thereof, it will be understood by those skilled in the art that various changes and modifications in form and details may be made therein without departing from the spirit and scope of the invention according to the following claims.

What is claimed is:

1. A Universal Serial Bus cable extender comprising, in combination:

two bus transceivers capable of receiving and transmitting signals bidirectionally in upstream and downstream paths along a bus for extending the length of a Universal Serial Bus cable for devices attached to each end of the Universal Serial Bus cable;

drive detection means for determining which port is sending data and enabling the other port;

End of Packet detection means for disabling transmissions;

speed detection means for determining a transmission speed of the device attached to the bus's downstream port and setting the upstream port for that speed; and suspend detection means for setting said transceivers drive detection means, End of Packet detection means, and speed detection means to a low power mode when the bus is in a suspend state.

2. A repeater system suitable for extending the effective length of a Universal Serial Bus comprising, in combination:

a pair of devices for exchanging data via a Universal Serial Bus;

first and second transceiver means for receiving and transmitting data;

means for connecting one of said pair of devices to the first transceiver means and for connecting the other of said pair of devices to the second transceiver means;

means for coupling said first and second transceiver means for interchanging data therebetween;

means responsive to said first and second transceiver means for detecting which transceiver is receiving data from one of said pair of devices;

means for enabling first and second transceiver means to communicate data between said pair of devices;

means responsive to a receiving transceiver for determining a speed of transmission of data from one of said pair of devices;

means coupled to said means responsive to a receiving transceiver for designating said speed of transmission to the other of said pair of devices and to the other transceiver;

means for detecting in response to signals from said first and second transceivers an End of Packet signal;

means responsive to said first and second transceiver means for supplying a suspend signal when said pair of devices are in a suspend mode; and means responsive to said suspend signal for causing said pair of devices and first and second transceiver means to assume a low power mode.

3. A method of extending the effective length of a Universal Serial Bus using a pair of coupled transceivers, each coupled to one of a pair of devices for communicating therebetween, the method comprising the steps of:

detecting which of said pair of coupled transceivers is receiving data from a first one of said pair of devices;

determining a speed at which said received data is being transmitted;

enabling a second one of said pair of devices to receive data at the speed at which said received data is being transmitted;

coupling said received data to the second one of said pair of devices detecting an End of Packet signal in said received data;

sensing a suspend condition of said pair of devices; and causing said pair of devices to assume a low power mode.

* * * * *